United States Patent Office 3,546,239
Patented Dec. 8, 1970

---

3,546,239
CERTAIN 1,2,3,6-TETRAHYDRO-PYRIDINE DERIVATIVES
Willy Leimgruber, Montclair, and Albert Ziering, Nutley, N.J., assignors to Hoffmann-La Roche Inc., Nutley, N.J., a corporation of New Jersey
No Drawing. Filed Jan. 5, 1968, Ser. No. 695,844
Int. Cl. C07d 31/28
U.S. Cl. 260—297
4 Claims

ABSTRACT OF THE DISCLOSURE

The compound of the formula

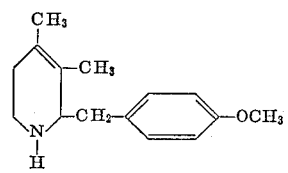

and its acid addition salts, useful as an intermediate for the preparation of pharmaceutically active benzomorphans and processes for its preparation are disclosed.

SUMMARY OF THE INVENTION

This invention relates to 2-(4-methoxybenzyl)-3,4-dimethyl-1,2,5,6-tetrahydropyridine, its acid addition salts, processes for the preparation thereof and intermediates formed by said processes.

DETAILED DESCRIPTION OF THE INVENTION 2-(4-methoxybenzyl - 3,4 - dimethyl-1,2,5,6-tetrahydropyridine, a novel compound, useful as an intermediate for the preparation of pharmaceutically active benzomorphans, can be prepared by alternate synthesis routes.

The preferred method of preparing this compound proceeds according to the following reaction scheme I.

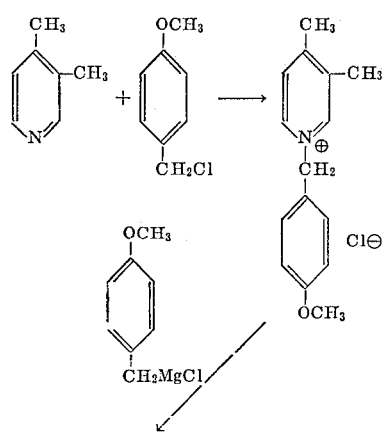

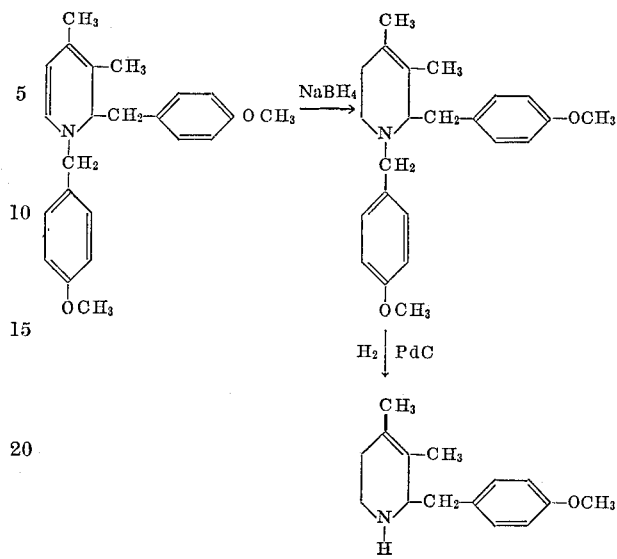

The starting compound p-methoxybenzyl chloride which is reacted with 3,4-lutidine can be prepared by reacting p-methoxybenzyl alcohol with hydrogen chloride. The reaction of 3,4-lutidine with p-methoxybenzyl chloride is exothermic and is effected by mixing the materials in a suitable solvent, e.g., acetonitrile. The reaction is initiated by boiling a few milliliters of the reaction solution until precipitation occurs and then seeding the main reaction solution. The product which is recovered, 1-(4-methoxybenzyl)-3,4-dimethyl pyridinium chloride, is then reacted with the Grignard reagent formed from p-methoxybenzyl chloride. This reaction is effected at room temperature in a suitable suspending agent, e.g., dry ether. The resulting product 1,2-di-(4-methoxybenzyl)-3,4-dimethyl-1,2-dihydropyridine is then reduced with sodium borohydride in alkaline medium, e.g., NaOH in methanol or sodium methoxide, at reflux for about 1.5 to 3 hours, preferably about 2 hours. The product, 1,6-di-(4-methoxybenzyl)-4,5-dimethyl-1,2,3,6-tetrahydropyridine, can be recovered as such or preferably converted into the hydrochloride by reacting with HCl gas in ether.

The hydrochloride can then be converted to 2-(4-methoxybenzyl)-3,4 - dimethyl - 1,2,5,6 - tetrahydropyridine hydrochloride by reduction with hydrogen in the presence of a palladium-carbon catalyst. This reaction is effected at room temperature until the theoretical amount of hydrogen is consumed.

An alternative method of preparing the desired product is accomplished according to the following reaction scheme II.

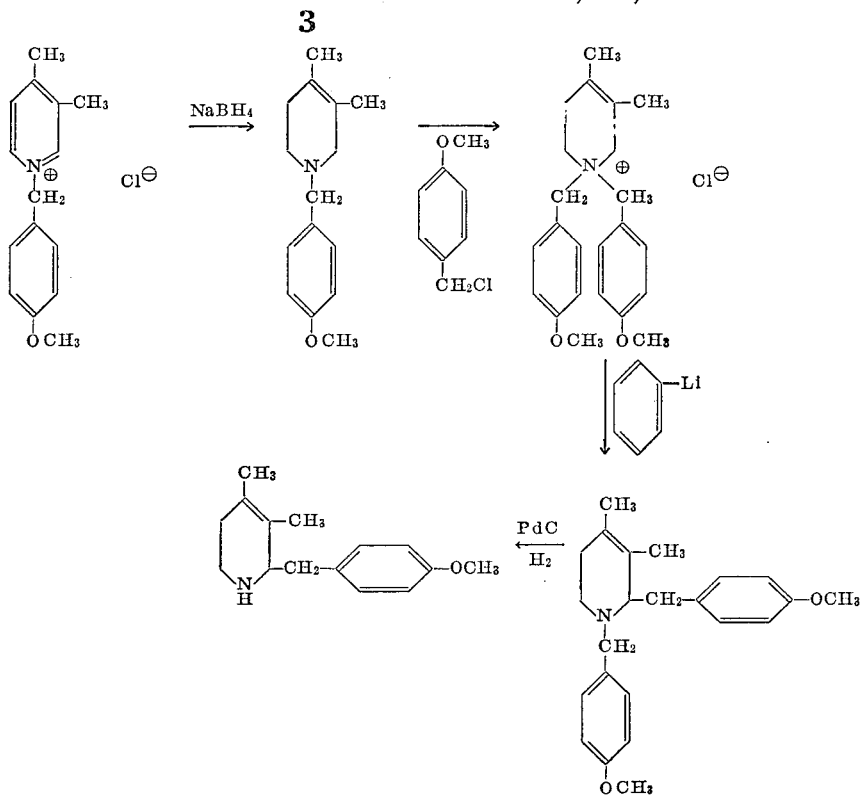

In this reaction scheme, 1-(4-methoxybenzyl)-3,4-dimethylpyridinium chloride is reduced by sodium borohydride in alkaline medium, e.g., NaOH in methanol or sodium methoxide. The reaction is exothermic to about 60° C. and is then maintained at that temperature for about 2 hours. The product, 1-(4-methoxybenzyl)-4,5-dimethyl-1,2,3,6-tetrahydropyridine, is then reacted with p-methoxybenzyl chloride on a steam bath to produce 1,1-di-(4-methoxybenzyl)-4,5-dimethyl-1,2,3,6-tetrahydro - pyridinium chloride. The latter is rearranged by reaction with phenyl lithium at reflux. The product, 1,6-di-(4-methoxybenzyl)-4,5-dimethyl - 1,2,3,6 - tetrahydropyridine hydrochloride is then hydrogenated using hydrogen and a palladium on carbon catalyst. The reaction is continued until the theoretical amount of hydrogen is consumed. The desired product, 2-(4-methoxybenzyl)-3,4-dimethyl-1,2,5,6-tetrahydropyridine hydrochloride, is then recovered.

The product can be utilized as an intermediate for preparing benzomorphans. For example, it can be cyclized according to known methods and substituents, e.g., cyclopropylmethyl, dimethylallyl, lower alkyl, added to the nitrogen atom according to known methods. The resulting known compounds have analgesic and analgesic antagonist properties.

The following examples are illustrative of this invention which is not intended to be limited to the details thereof. All temperatures are in ° C.

EXAMPLE 1

Preparation of 2 - (4 - methoxybenzyl) - 3,4 - dimethyl-1,2,5,6-tetrahydropyridine hydrochloride according to scheme I (a) Preparation of p-methoxybenzyl chloride.—1 kg. of p-methoxybenzyl alcohol was dissolved in 3.7 l. of dry, thiophene-free benzene and the solution cooled in an ice-bath. Hydrogen chloride was bubbled into the solution during which time the inside temperature was kept below 20°. When 113 ml. of water had been collected and removed, 300 g. of anhydrous magnesium sulfate was added to the benzene solution. The solution was filtered and the benzene removed in vacuo (water-bath temperature 30°). The product was crude p-methoxybenzyl chloride which on vapor phase chromatography showed an 89% component. This material can be used crude or it can be distilled (B.P. 77–9°/1 mm., showing by VPC a 97.5% component).

(b) Preparation of 1-(4-methoxybenzyl)-3,4-dimethylpyridinium chloride.—430 g. (2.75 moles) of crude p-methoxybenzyl chloride was added to a stirred solution of 268 g. (2.5 moles) of 3,4-lutidine in 800 ml. of acetonitrile. The exothermic reaction may be initiated by boiling a few milliliters of solution with an equal volume of acetone until crystallization occurs and then seeding the solution. The mixture was stirred at room temperature for two hours and filtered. The product was washed with 200 ml. of acetonitrile and then dried in a vacuum oven at 50° overnight. The product melted at 191–3° (sintered at 188°). A small portion was recrystallized from acetone and melted at 192–3°.

Analysis.—Calcd. $C_{15}H_{18}ClNO$ (percent): C, 68.31; H, 6.83. Found (percent): C, 68.24; H, 7.06.

(c) Preparation of 1,2-di-(4-methoxybenzyl)-3,4-dimethyl-1,2-dihydropyridine.—156 g. (1 mole) of crude p-methoxybenzyl chloride in 1 l. of dry ether was added over a 5 hour period to 60 g. of magnesium turnings (2.5 g. atoms) 60 g. of magnesium powder (2.5 g. atoms) in 1 l. of refluxing dry ether, under nitrogen. The resulting Grignard reagent was filtered under nitrogen through glass wool and added quickly to a stirred suspension of 1-(4-methoxybenzyl)-3,4-dimethylpyridinium chloride (236 g., 0.9 mole) in 2 l. of dry ether. The reaction mixture was stirred overnight at room temperature. It was then poured onto an ice-ammonium chloride solution. The ether layer was separated, dried (anhydrous potassium carbonate) and the ether distilled off. The crude product was a reddish oil.

(d) Preparation of 1,6-di-(4-methoxybenzyl)4,5-dimethyl-1,2,3,6-tetrahydropyridine hydrochloride.—25.4 g. of sodium borohydride was added portionwise to a rapidly stirred mixture of 241 g. of crude 1,2-di-(4-methoxybenzyl)-3,4-dimethyl-1,2-dihydropyridine and 350 ml. of 1 N sodium hydroxide in 540 ml. of methanol over a period of 20 minutes without cooling. After the addition, the mixture was refluxed for 2 hours. The mixture was cooled, diluted with 500 ml. of water and the oil extracted with ether. The ether extract was dried over anhydrous potassium carbonate and the ether distilled off. The main fraction distilled from 210–235°/1 mm. The oil was dissolved in 500 ml. of dry ether and the product was converted to the hydrochloride by bubbling hydrogen chloride gas into the solution. The ether was decanted from the pasty hydrochloride and 300 ml. of acetone added. The mixture was refluxed until the pasty salt solidified. The product was filtered, M.P. 196–200°. The crystals were recrystallized from acetone-methanol to yield the desired product, M.P. 203–206°.

Analysis.—Calcd. $C_{23}H_{29}NO_2 \cdot HCl$ (percent): C, 71.22; H, 7.75. Found (percent): C, 71.06; H, 8.08.

(e) Preparation of 2-(4-methoxybenzyl)-3,4-dimethyl-1,2,5,6-tetrahydropyridine hydrochloride.—5 g. of 10% palladium-carbon catalyst was added to 38.8 g. (0.1 mole) of 1,6-di-(4-methoxybenzyl)-4,5-dimethyl - 1,2,3,6-tetrahydropyridine hydrochloride in 250 ml. methanol. The mixture was shaken in a Parr hydrogenation apparatus for 6 hours at 50 lbs. pressure and room temperature or until 0.1 mole of hydrogen had been absorbed. The mixture was filtered and the filtrate concentrated in vacuo. The residue (oil) was crystallized by refluxing with 100 ml. of ethyl acetate. The first crop had a M.P. 145–7°. A second crop was obtained by removing the ethyl acetate and adding ether to solidify the residual oil. The crude solid was recrystallized from acetone-methanol. The combined fractions were recrystallized from ethyl acetate-methanol and had a M.P. 148–150°.

Analysis.—Calcd. $C_{15}H_{21}NO \cdot HCl$ (percent): C, 67.28; H, 8.22; N, 5.23. Found (percent): C, 67.31; H, 8.76; N, 5.21.

EXAMPLE 2

Preparation of 2-(4-methoxybenzyl)-3,4-dimethyl-1,2,5,6-tetrahydropyridine hydrochloride according to scheme II (a) Preparation of 1-(4-methoxybenzyl)-4,5-dimethyl-1,2,3,6-tetrahydropyridine.—A solution of 21.6 g. (.082 mole) of 1-(4-methoxybenzyl)-3,4 - dimethylpyridinium chloride and 4.2 g. of sodium hydroxide (.105 mole) in 100 ml. of methanol and 60 ml. of water was stirred and 4 g. of sodium borohydride (.105 mole) added in portions. The temperature of the solution rose during the addition and was then maintained at 60° for 2 hours with stirring. The cooled solution was diluted with 200 ml. of water and extracted with 3× 200 ml. of ether and the ether extract dried over anhydrous potassium carbonate. The ether was removed in vacuo and the residue distilled. The main fraction boiled at 196–199°/20 mm., exhibiting on VPC a 94% component. The hydrochloride melted at 164–166°, (acetone-methanol).

Analysis.—Calcd. $C_{15}H_{21}NO \cdot HCl$ (percent): C, 67.28; H, 8.22. Found (percent): C, 67.51; H, 8.22.

(b) Preparation of 1,1-di-(4-methoxybenzyl)-4,5-dimethyl - 1,2,3,6 - tetrahydropyridinium chloride.—A solution of 14.5 g. (0.063 mole) of 1-(4-methoxybenzyl)-4,5-dimethyl-1,2,3,6-tetrahydropyridine and 9.7 g. (0.063 mole) of p-methoxybenzyl chloride in 18 ml. of acetone was warmed on a steam bath and then allowed to stand overnight. Ether was added to precipitate the product as an oil which soon solidified and yielded a crude hygroscopic product. This crude material was used directly in the next step without further purification.

(c) Preparation of 1,6-di-(4-methoxybenzyl)-4,5-dimethyl-1,2,3,6-tetrahydropyridine.—300 ml. of 2.14 M phenyl lithium in ether was added to a suspension of 115.3 g. (0.3 mole) of 1,1-di-(4-methoxybenzyl)-4,5-dimethyl-1,2,3,6-tetrahydropyridinium chloride in 500 ml. of anhydrous ether. The suspension was refluxed for 1.75 hours, then cooled and ice water added to decompose the complex. The separated ether layer was extracted with dilute hydrochloric acid (10%) and the acid extract made alkaline with ammonium hydroxide. The separated oil was extracted with ether and the solution dried (potassium carbonate). The ether was removed in vacuo and the residue distilled at 210–225°/1 mm. This material consisted of at least three major components in the ratio 44:22:20 as determined by VPC. The major component corresponds to the desired product. The distillate was dissolved in 250 ml. of ethyl acetate and precipitated as the hydrochloride. The crude hydrochloride was recrystallized from acetone and had a M.P. 198–202°.

(d) Preparation of 2-(4-methoxybenzyl)-3,4-dimethyl 1,2,5,6-tetrahydropyridine hydrochloride.—A solution of 8.8 g. (.023 mole) of 1,6-di-(4-methoxybenzyl)-4,5-dimethyl-1,2,3,6-tetrahydropyridine hydrochloride in 250 ml. of methanol was hydrogenated at 50 lbs. pressure and room temperature in the presence of 1.3 g. 10% palladium-on-carbon catalyst. The theoretical amount of hydrogen was taken up in 14 hours. The solution was filtered and the filtrate concentrated to an oil in vacuo. The oil was made alkaline with ammonium hydroxide and the free base extracted with ethyl acetate. The solvent was removed in vacuo and the residual oil distilled. The main portion boiled at 136–140°/.7 mm. The product was converted to the hydrochloride in ethyl acetate and the salt recrystallized from ethyl acetate-methanol, M.P. 144–146°.

Analysis.—Calcd. $C_{15}H_{21}NO \cdot HCl$ (percent): C, 67.28; H, 8.22; N, 5.23. Found (percent): C, 66.94; H, 8.27; N, 5.18.

We claim:
1. 1,6-di-(4-methoxybenzyl) - 4,5 - dimethyl-1,2,3,6-tetrahydropyridine.
2. 1,6-di-(4-methoxybenzyl) - 4,5 - dimethyl-1,2,3,6-tetrahydropyridine hydrochloride.
3. 1-(4-methoxybenzyl) - 4,5-dimethyl-1,2,3,6-tetrahydropyridine.
4. 1-(4-methoxybenzyl)-4,5 - dimethyl-1,2,3,6-tetrahydropyridine hydrochloride.

References Cited

UNITED STATES PATENTS 3,073,837  1/1963  Rivard _____ 260—297
3,093,650  6/1963  Fry et al. _____ 260—290H

OTHER REFERENCES

Noller: Chemistry of Organic Compounds, Saunders, pp. 456, 457, 571 and 572 (1965).

ALAN L. ROTMAN, Primary Examiner

U.S. Cl. X.R.
260—294.7, 999